(12) United States Patent
Edwards et al.

(10) Patent No.: US 6,873,327 B1
(45) Date of Patent: Mar. 29, 2005

(54) METHOD AND SYSTEM FOR AUTOMATICALLY ADDING EFFECTS TO STILL IMAGES

(75) Inventors: Eric Edwards, San Francisco, CA (US); Clay Fisher, Belmont, CA (US); Kurt Jonach, San Jose, CA (US); Neal Manowitz, Mahwah, NJ (US); Kengo Masu, San Diego, CA (US); Robert Jay Sato, Sausalito, CA (US); John Tree, London (GB)

(73) Assignees: Sony Corporation, Tokyo (JP); Sony Electronics, Park Ridge, NJ (US)

(*) Notice: Subject to any disclaimer, the term of this patent is extended or adjusted under 35 U.S.C. 154(b) by 710 days.

(21) Appl. No.: 09/695,100

(22) Filed: Oct. 23, 2000

Related U.S. Application Data

(60) Provisional application No. 60/181,813, filed on Feb. 11, 2000.

(51) Int. Cl.$^7$ .............................................. G06T 17/00
(52) U.S. Cl. ....................................................... 345/473
(58) Field of Search ............................... 345/418, 619, 345/620, 629, 473, 474

(56) References Cited

U.S. PATENT DOCUMENTS 5,963,203 A * 10/1999 Goldberg et al. ............ 345/723
6,195,101 B1 * 2/2001 Ghislain Bossut et al. . 345/629

* cited by examiner

*Primary Examiner*—Cliff N. Vo
(74) *Attorney, Agent, or Firm*—Valley Oak Law

(57) ABSTRACT

A method and system for automatically adding effects to still images are described. In one embodiment, a source image and a template are selected. Further, designated areas of the source image are automatically replaced with template image information, the template image information alters the source image to produce special effects. In an alternate embodiment, designated areas of the source image are automatically replaced with template image information, the template image information giving the appearance of animation of the source image. In another alternate embodiment, the selected areas of the source image are replaced with template image information to produce an animation image sequence, the template image information giving the appearance of animation of the source image.

33 Claims, 12 Drawing Sheets

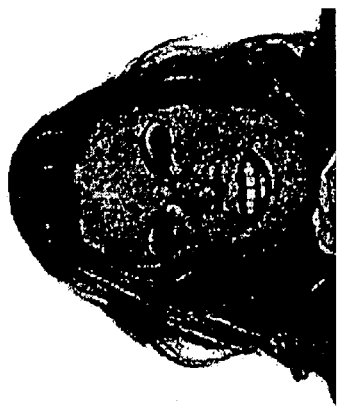
FIGURE 7
FIGURE 8
FIGURE 9
FIGURE 10

FIGURE 11
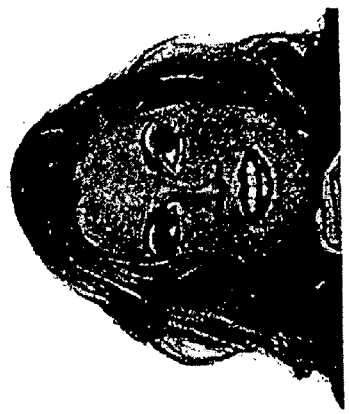
FIGURE 12
FIGURE 13
FIGURE 14

METHOD AND SYSTEM FOR AUTOMATICALLY ADDING EFFECTS TO STILL IMAGES

This application claims benefit of U.S. Provisional Application No. 60/181,813 filed Feb. 11, 2000.

FIELD OF THE INVENTION

The present invention relates generally digital imaging. In particular, the present invention relates to adding special effects to digital images.

BACKGROUND OF THE INVENTION

There is no easy way for a user to change the appearance of a picture to match a particular time-of-day. There is no automatic method for a user to change a picture to match a particular climate condition. Manual systems for changing the picture to match a time-of-day or climate condition are tedious and require that the user have significant time and image editing skills.

SUMMARY OF THE INVENTION

A method and system for automatically adding effects to still images are described. In one embodiment, a source image and a template are selected. Further, designated areas of the source image are automatically replaced with template image information, the template image information alters the source image to produce special effects. In an alternate embodiment, designated areas of the source image are automatically replaced with template image information, the template image information giving the appearance of animation of the source image. In another alternate embodiment, the selected areas of the source image are replaced with template image information to produce an animation image sequence, the template image information giving the appearance of animation of the source image.

BRIEF DESCRIPTION OF THE DRAWINGS

Features and advantages of the present invention will be apparent to one skilled in the art in light of the following detailed description in which:

FIGS. 7 through 16 are exemplary resulting animation images;

DETAILED DESCRIPTION

Figure 1:
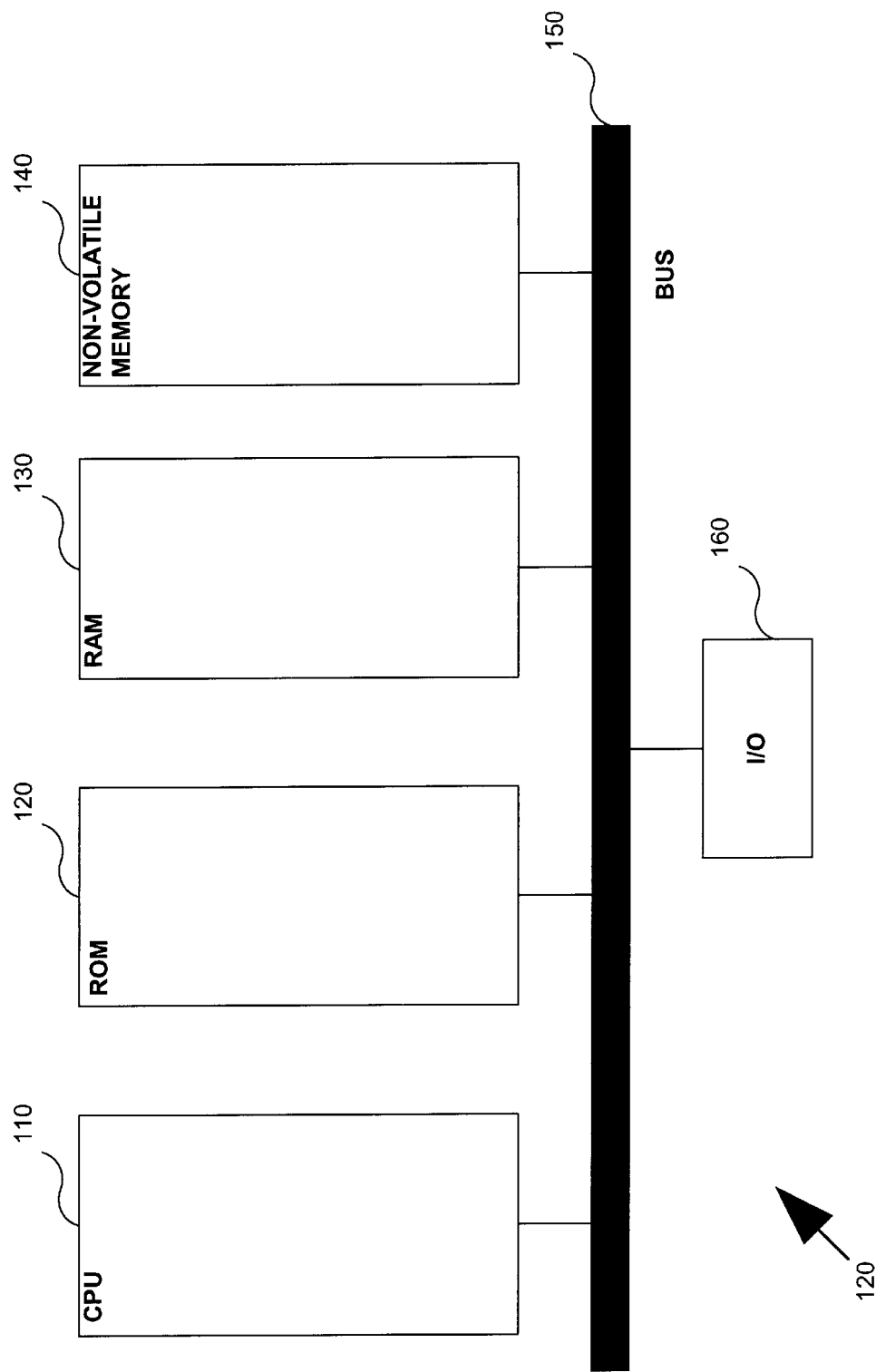
FIG. 1 is a block diagram of one embodiment of an architecture of a computer system.

A method and system for automatically adding effects to still images are described. In one embodiment, a source image and a template are selected. Further, designated areas of the source image are automatically replaced with template image information, the template image information alters the source image to produce special effects. In an alternate embodiment, designated areas of the source image are automatically replaced with template image information, the template image information giving the appearance of animation of the source image. In another alternate embodiment, the selected areas of the source image are replaced with template image information to produce an animation image sequence, the template image information giving the appearance of animation of the source image.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. Although the description that follows describes the embodiments in terms of a web site, the embodiments are not so limited and may be practiced with any displayable information.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing " or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of one embodiment of an architecture for a computer system 120. Referring to FIG. 1, CPU 110 is coupled via bus 150 to a variety of memory structures and input/output (I/O) 160. The memory structures may include read only memory (ROM) 120, random access memory (RAM) 130, and/or non-volatile memory 140. In one embodiment, CPU 110 may also be coupled via bus 150 to a network interface. The network interface may be used to communicate between computer system 120 and a variety of other computers via a wide area network such as, for example, the Internet or communicate over a local area network. The network interface may be coupled to a wide area network by any of a variety of means such as, for example, a telephone connection via modem, a DSL line, or the like.

Figure 2:
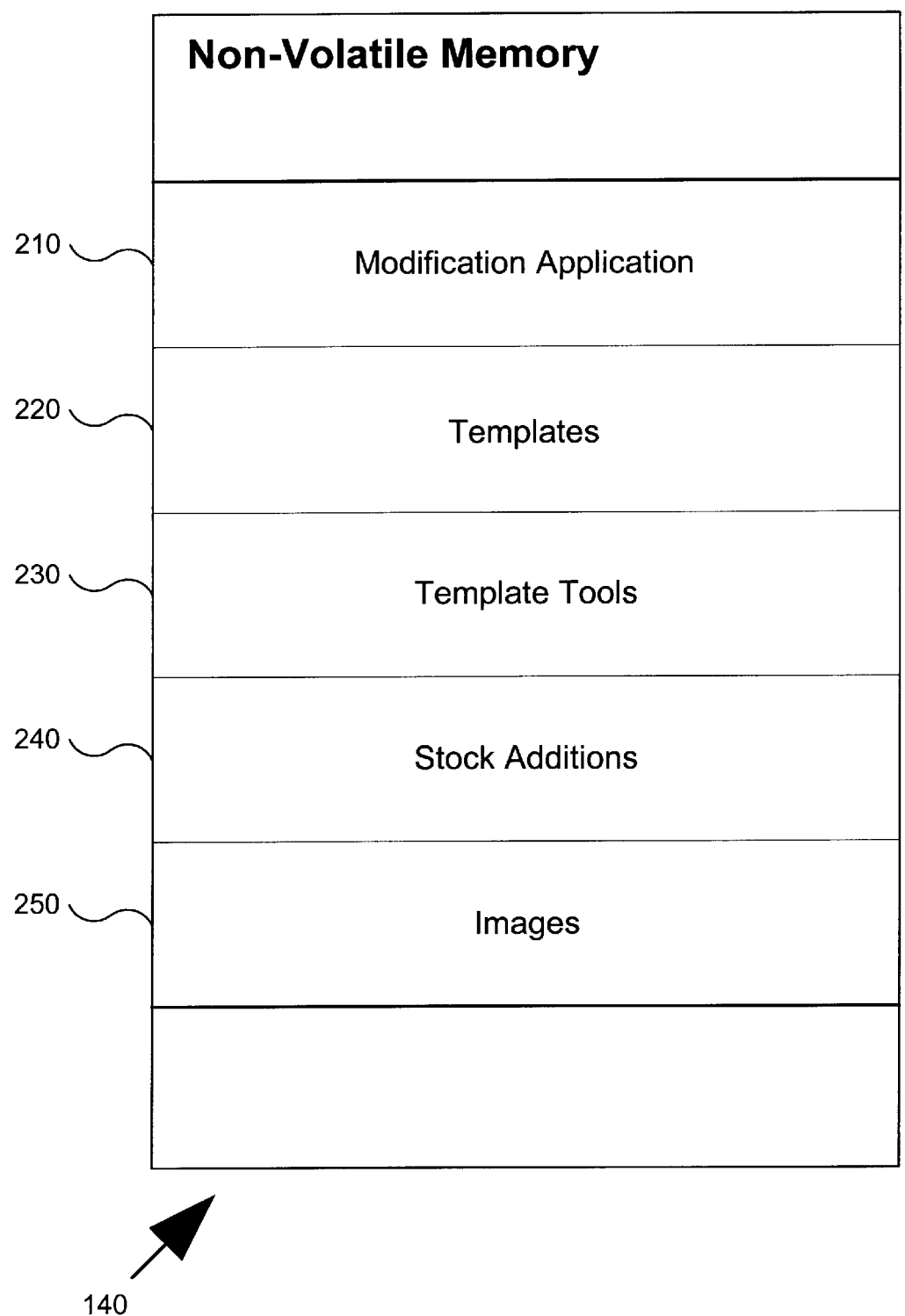
FIG. 2 is a block diagram of one embodiment of a non-volatile memory, such as that shown in FIG. 1.

FIG. 2 is a block diagram of one embodiment of non-volatile memory 140 of FIG. 1. Referring to FIG. 2, non-volatile memory 140 contains modification application 210, templates 220, template tools 230, stock additions 240, and images 250. Modification application 210 may be used to manipulate source images and templates 220 to automatically produce modified images and animations. The source images are modified to produce special effects. Source images, together with modified images and animations, may be stored in images 250. Template tools 230 may be used to selectively modify source images. Stock additions 240 contain image objects that may be added to source images to change the character of the source images.

In an alternate embodiment, templates 220, template tools 230, and/or stock additions 240 may be stored on a remote server and accessed via a network connection by modification application 210. In this embodiment, a fee may be charged for the use of the templates 220, template tools 230, and/or stock additions 240.

Figure 3:
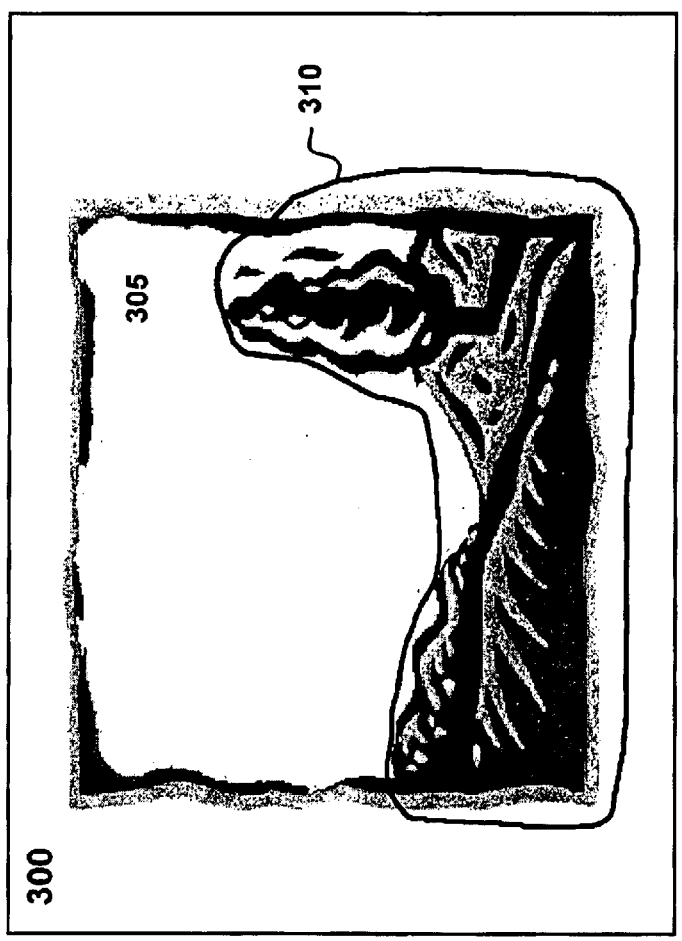
FIG. 3 is an exemplary source image.

FIG. 3 is an exemplary source image 300. Referring to FIG. 3, source image 300 represents an image that may be manipulated by a user. Source image 300 may be obtained by a variety of means such as, for example, scanning a photograph and saving the resulting scanned image in images 250, obtaining a digitized image from a photographic processor such as Sony Image Station [Rich, please correct/alter?], or obtaining a stock image from an image provider. Referring again to FIG. 3, source image 300 includes sky area 305 and foreground 310.

Figure 4:
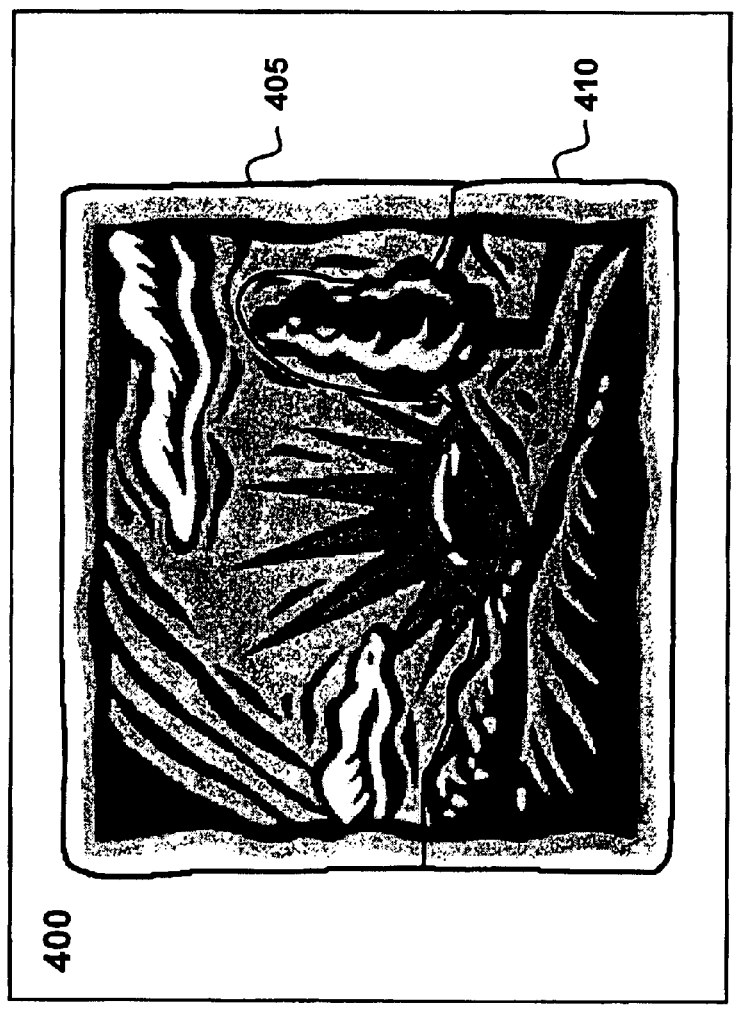
FIGS. 4 through 6 are exemplary resulting images.
Figure 5:
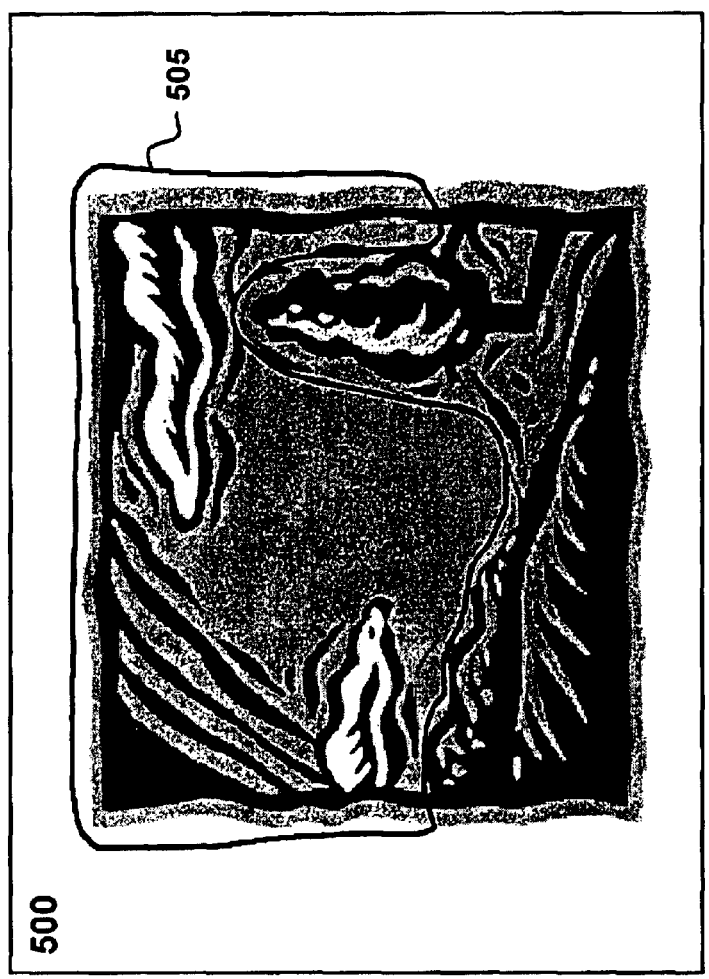
Figure 6:
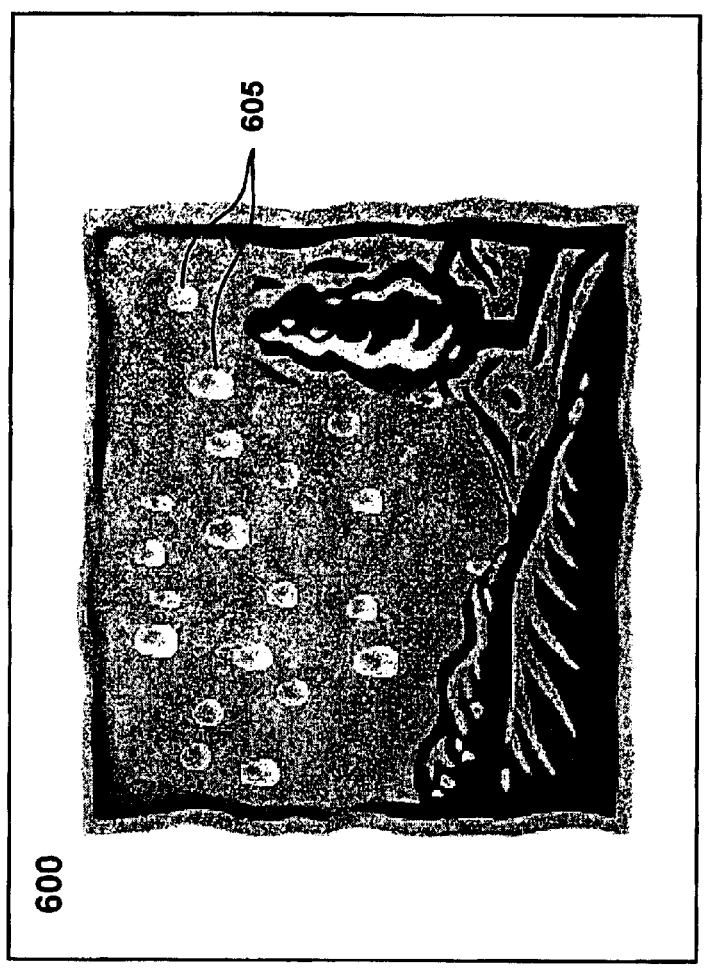
Figure 16:
Figure 15:

FIGS. 4 through 6 and are exemplary resulting images after modification of source image 300. Referring to FIG. 4, resulting image 400 includes sky area 405 and foreground 410. In one embodiment, the user selects source image 300 and selects a template from templates 220. The user may select from a variety of predefined templates 220 such as, for example, Sunrise, Sunset, winter, spring, fall, summer, starry night, moonlit in night, romantic, or the like. In one embodiment, the user may define a template 220 based upon a series of predefined selections. For example, the user may select predefined templates selections such as winter and night to form a new template 220 for a winter's night. In the FIG. 4 example, a sunrise template has been automatically combined with source image 300 to produce resulting image 400. In one embodiment, sky area 305 is automatically identified by modification application 210 and replaced with sunrise template 220 information to produce sky area 405. Foreground 310 may be modified by modification application 210 to further give the impression of a sunrise by, for example, tinting foreground 310 to produce foreground 410. In addition, the user may optionally select a template design or tool that represents a climate condition such as raining or snowing. In one embodiment, the image may be edited to add the appearance of rain (light rain, hard rain) or snow (light, heavy) with the use of template tools 230 and stock additions 240.

In one embodiment, the user may add climate elements that are specific for a climate condition using stock additions 240. For example, puddles may be added to source image 300 in order that source image may be modified to look rainy. Raindrops 605 may be added and the image darkened to reflect a rainstorm as illustrated in FIG. 6. Snow and icicles may be added to climates that appear to be snowing.

A single template 220 may alter the time-of-day represented in source image 300 based on a time the user pre-selects. Modification application 210 may use template 220 to automatically alter source image 300 according to a pre-defined schedule including, for example, the actual passage of time during the course of a day. At night source image 300 may appear as if it was taken at night. In the morning, source image 300 may appear as if it was taken in the morning. Shadows may be changed as the time-of-day changes, or remain fixed throughout the apparent time change. Night scenes may appear to be during a full moon or on a cloudy night. For example, FIG. 5 illustrates source image 300 combined with a cloudy day template 220. In this example, modification application 210 has replaced sky area 305 with a cloudy sky area 505. The resulting images may be used, for example, as an icon on a computer to indicate the time-of-day or outside weather conditions.

In one embodiment, the user may "paint on" climate effects, such as snow, icicles, or puddles. In this embodiment, the user uses template tools 230 to paint on stock additions 240 onto source image 300. In an alternate embodiment, stock additions 240 may be automatically added by modification application 210 or by the user dragging and dropping stock additions 240 onto source image 300. In another alternate embodiment, template tools 230 may provide a mask that the user may adjust to determine the area to be enhanced by template 220. The mask prevents the modification of source image areas not covered by the mask.

In one embodiment, template tools 230 may provide, in combination with or separate from the mask tool, for "active climates" such as "windy", which shifts leaves of a tree or grass to give the appearance of a breeze, or "ripple", which give the appearance of a breeze over water. These effects may be enhanced with the addition of moving clouds. When "windy" is combined with "raining", the rain may fall at an angle. Template tools 230 may allow the user to selectively add animation to parts of an image. Modification application 210 may allow the user to apply the animation to a whole or part of an image (masking) to represent rain (falls and forms puddles) or snow (snow falls and piles-up).

In an alternate embodiment, source image 300 may be modified to produce animations and sounds and other effects may be added to the image 300 based upon a chosen template 220. The animations and effects may be added to source image 300 using a single click, drag and drop, multiple predefined steps, or a fully automatic procedure. The animations and/or effects may be used, for example, to give the appearance of a change in weather conditions, change in time-of-day, or change of seasons. For example, a source image 300 and template 220 may be selected to, for example, represent the passage of time during the day. In an alternate embodiment, the time-of-day that source image 300 was taken may be provided. In another alternate embodiment, a starting and ending time may be provided.

In one embodiment, modification application 210 modifies source image 300 using template 220 to produce a number of resulting images. For example, template 220 may be used to modify source image 300 to automatically produce resulting image 400 and resulting image 500. In one embodiment, the user may add sound and other effects to the images. For example, the user may add a "chirping bird" sound effect to resulting image 400. The resulting images may be combined to form an animation of a sunrise or be used as background images or icons to represent the passage of time. In this embodiment, modification application 210 automatically produces the multiple resulting images without further input by the user. Modification application 210 may automatically alter source image 300 according to a predefined schedule. When viewed at night, the resulting image looks like it was taken at night. The series of images may be viewed in real time, saved as a movie or series of still images, or printed as a hologram. Although described as an animation covering the passage of time, any animation may be generated by modification application 210 based upon the chosen template 220. For example, the animation may depict the changes in season. In an alternate embodiment, the user may use a mask to provide a selected area of source image 300 for animation.

The user may derive a complete animation together with sound and other effects from a single source image with modification application 210 and templates 220. In addition, the user may utilize template tools 230 and stock additions 240 to further enhance the animation images.

In an alternate embodiment, profile information of a specific user may be combined with the template 220 information in order to produce a specific result. For example, if a specific user prefers yellow sunsets as compared with orange sunsets, the template 220 information is modified to reflect this. Thus, the resulting image produced from a source image 300 using a sunset template 220 would produce a yellow sunset for the user rather than the provided template 220 that produces a more orange or purple sunset.

FIGS. 7 through 16 are exemplary resulting animation images. Referring to FIG. 7, source image 700 may be used to animate the facial features of the image. In one embodiment, the user selects the facial feature or features the user wishes to animate. The facial features may be selected by using a pre-defined template 220 or by using template tools 230 to define the facial features for animation. For example, a template 220 may be used to define a full front face or tools may be used to brush over or mask the eyes, eyebrows, or mouth. If a template 220 is used, modification application 210 automatically recognizes the portion of the source image that corresponds to the template and creates an animation of that portion of the image. The brush may be used on the lips of source image 700 to define the feature for animation. Modification application 210 uses the selected facial features (either by template or mask) and animates the feature. For example, if the user selects a blinking eye template 220, modification application 210 uses the template 220 to identify the eyes in the source image 700 and create an animated version of the image in which the eyes blink. For example, FIGS. 8 through 10 illustrate the application of the blinking eye template 220 to source image 700. Further, the user may select the talking mouth template 220 which may be used by modification application 210 to animate the mouth area of source image 700 to give the appearance of the image talking. This is illustrated in FIGS. 11 through 16. In addition, the user may choose to combine the two templates 220 to create a blinking/talking animation, as illustrated in FIGS. 7 though 16.

In an alternate embodiment, the user may select a template 220 that represents a landscape, weather condition, or time-of-day feature they wish to animate. In this embodiment, the portion of the source image that corresponds to the template is automatically recognized and the animation is created. For example, the user may select a "wind in the trees" template 220. The template 220 identifies the leaves of a tree in the source image and creates and animated version of the image where the leaves move, as though there is wind. In another example, the user may select a "twinkling stars" template. The template 220 identifies the stars in the night sky and the stars are animated so that they appear to twinkle on and off.

In an alternate embodiment, the user may select an imaging tool 230 that represents a facial feature (or, alternatively, any feature in an image such as tree, house, etc.) the user wishes to animate. The user may then mask or brush the appropriate area of the source image using the selected tool 230. The selected portion of the image is modified to "move", based on the original image content and the selected tool 230. For example, if a "speaking brush" is chosen and the mouth of an image is selected with the tool, the lips will be animated to give the appearance of speech.

In addition, templates or brush tools may be provided for weather effects such as "windy", which shifts leaves of a tree to give the appearance of a breeze, or "ripple", which give the appearance of a breeze over water. These effects may be enhanced with the addition of moving clouds. The brush tools may allow the user to selectively add animation to part of an image. The template may allow the user to apply the animation to a whole or part of an image (masking) to represent rain (raindrops and puddles) or snow (snow falls and snowdrifts).

Figure 17:
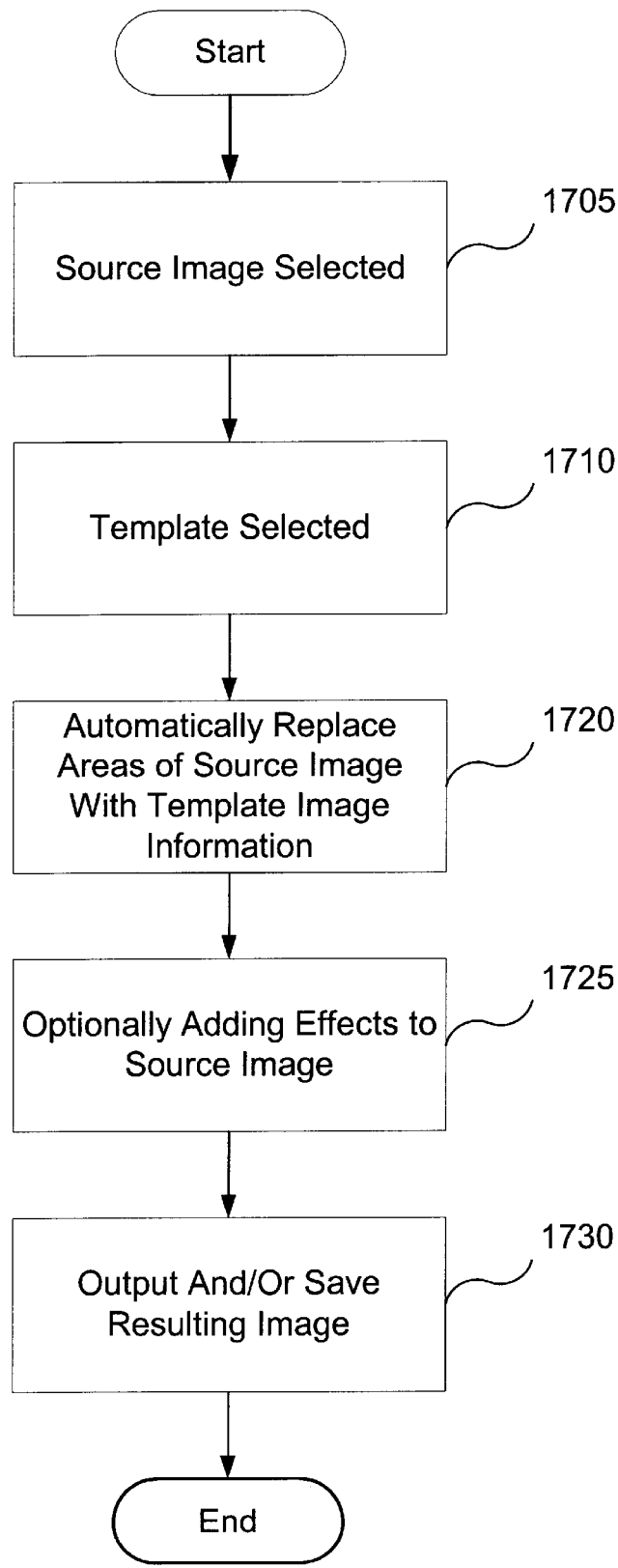
FIG. 17 is a flow diagram of one embodiment for automatically adding effects to still images.

FIG. 17 is a flow diagram of one embodiment for automatically adding effects to still images. Initially at processing block 1705, a source image 300 is selected. In an alternate embodiment, multiple source images may be selected. At processing block 1710, a template 220 is selected. In an alternate embodiment, multiple templates 220 may be selected. The user may select from a variety of predefined templates 220 such as, for example, Sunrise, Sunset, winter, spring, fall, summer, starry night, moonlit night, romantic scene, or the like. In one embodiment, the user may define a template 220 based upon a series of predefined selections. For example, the user may select predefined templates selections such as winter and night to form a new template 220 for a winter's night.

At processing block 1720, the selected template is used to automatically replace areas of the source image 300 with information contained within the template 220. For example, a sunrise template 220 may be automatically combined with source image 300 to produce a sunrise resulting image. In one embodiment, the sky area may be automatically identified and replaced with sunrise template 220 information to produce a new sky area. In addition, the foreground of the source image may be modified to further give the impression of a sunrise by, for example, tinting the foreground to represent sunrise colors.

At processing block 1725, the user may optionally add effects to the source image 300 or resulting image. For example, the user may add climate elements that are specific for a climate condition using stock additions 240. For example, puddles may be added to source image 300 in order that source image may be modified to look rainy. Raindrops 605 may be added and the image darkened to reflect a rainstorm.

At processing block 1730, the resulting image is output on I/O 160 and/or saved in images 250.

Figure 18:
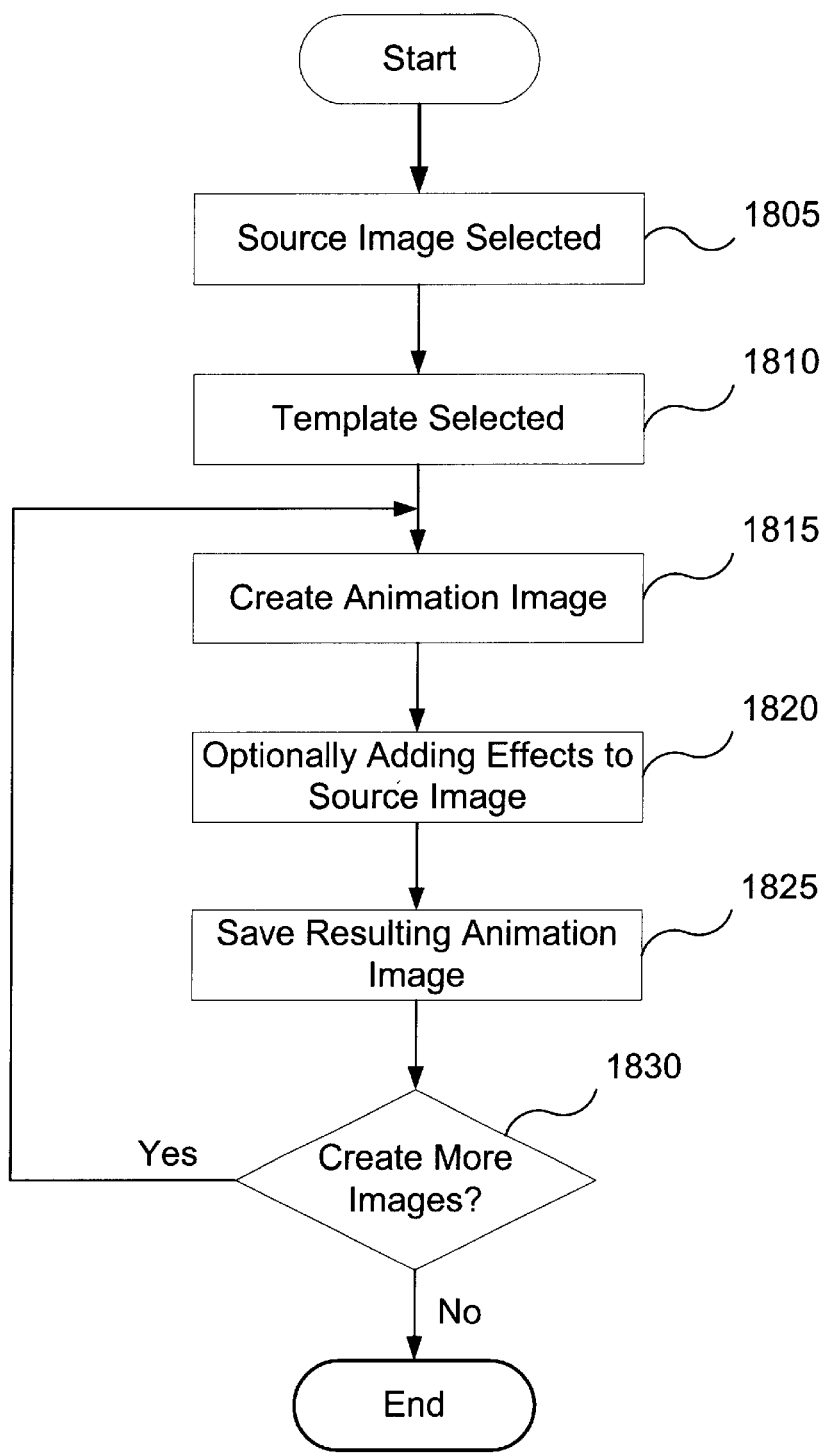
FIG. 18 is a flow diagram of one embodiment for automatically animating a still image.

FIG. 18 is a flow diagram of one embodiment for automatically animating a still image. Initially at processing block 1805, a source image 300 is selected. At processing block 1810, a template 220 is selected. The user may select from a variety of predefined templates 220 such as, for example, Sunrise, Sunset, winter, spring, fall, summer, starry night, moonlit night, romantic scene, or the like. In one embodiment, the user may define a template 220 based upon a series of predefined selections. For example, the user may select predefined templates selections such as winter and night to form a new template 220 for a winter's night. For example, a source image 300 and template 220 may be selected to, for example, represent the passage of time during the day. In an alternate embodiment, the time-of-day that source image 300 was taken may be provided. In another alternate embodiment, a starting and ending time may be provided.

At processing block 1815, a first animation image is created. At processing block 1820, the user may optionally add sound or other effects to the resulting animation image. At processing block 1825, the resulting animation image is saved.

At processing block 1830, it is determined if more images are to be created based upon the template 220. If more images are to be created, processing continues at processing block 1815. If no more images are to be created, processing stops for the desired animation.

Figure 19:
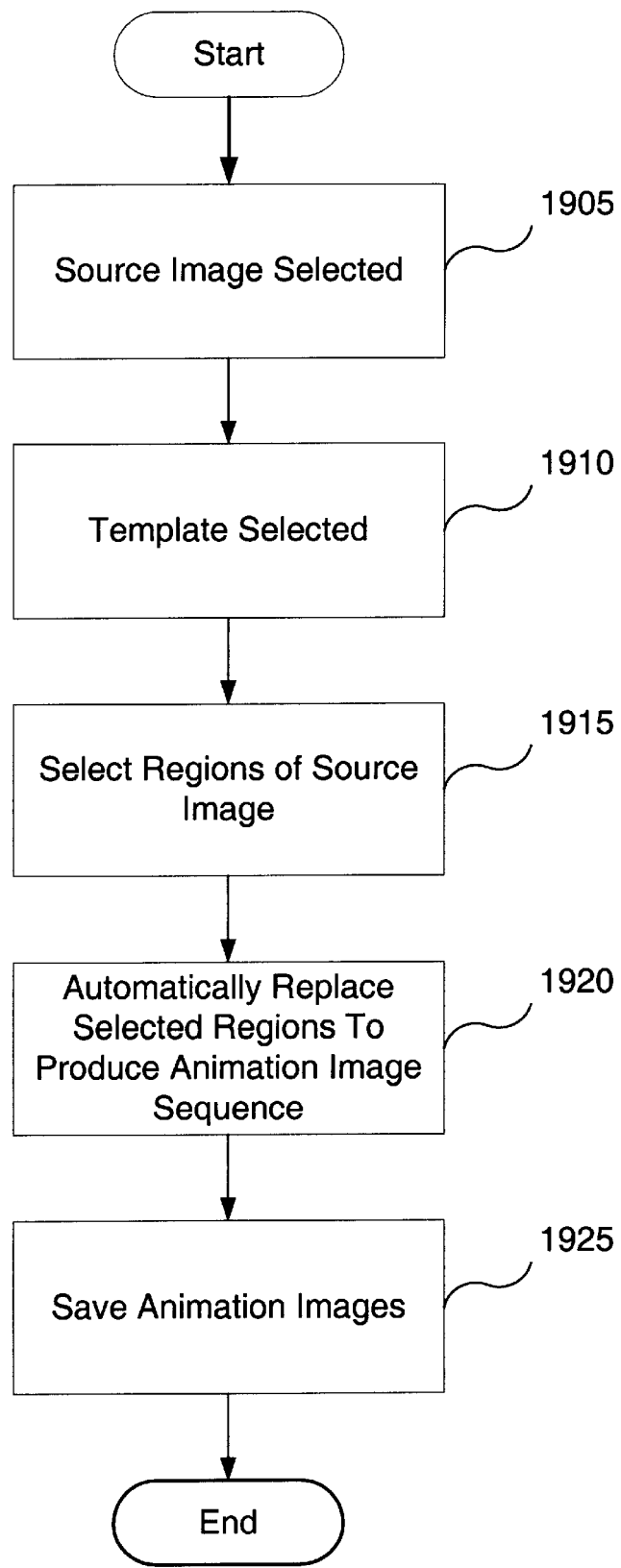
FIG. 19 is a flow diagram of another embodiment for automatically animating a still image.

FIG. 19 is a flow diagram of another embodiment for automatically animating a still image. Initially at processing block 1905, a source image 300 is selected. At processing block 1910, a template 220 is selected. The user may select from a variety of predefined templates 220 such as, for example, Sunrise, Sunset, winter, spring, fall, summer, starry night, moonlit night, romantic scene, or the like. In one embodiment, the user may define a template 220 based upon a series of predefined selections. For example, the user may select predefined templates selections such as winter and night to form a new template 220 for a winter's night. For example, a source image 300 and template 220 may be selected to, for example, represent the passage of time during the day. In an alternate embodiment, the time-of-day that source image 300 was taken may be provided. In another alternate embodiment, a starting and ending time may be provided.

At processing block 1915, regions of the source image 300 are selected for animation. In one embodiment, the user selects the image features the user wishes to animate. For example, facial features may be selected by using predefined templates 220 or by using template tools 230 to define the facial features. For example, a template 220 may be used to define a full front face or tools may be used to brush over or mask the eyes, eyebrows, or mouth. If a template 220 is used, the features of the source image that correspond to the template are automatically recognized.

At processing block 1920, the template or tool information is used to replace the selected regions of the source image to produce an animation sequence. In one embodiment, the processing continues until the required number of animation cells are created in order to produce the animation sequence.

At processing block 1925, the animation sequence is saved in images 250.

The specific arrangements and methods herein are merely illustrative of the principles of this invention. Numerous modifications in form and detail may be made by those skilled in the art without departing from the true spirit and scope of the invention.

What is claimed is:

1. A method for automatically adding effects to still images, the method comprising:

selecting a source image;

selecting a template including template information;

automatically replacing designated areas of the source image with the template information, the template image information alters the source image to produce special effects, wherein automatically replacing occurs without user modification.

2. The method of claim 1 further comprising:

adding image effects to the source image.

3. The method of claim 1 further comprising:

defining a template based upon a series of predefined template selections.

4. The method of claim 1 further comprising:

automatically determining areas of the source image for replacement with template image information.

5. The method of claim 1 further comprising:

manually selecting areas of the source image for replacement with template image information.

6. A method for automatically animating a still image, the method comprising:

selecting a source image;

selecting a template including template information; and automatically replacing designated areas of the source image with the template information, the template information giving the appearance of animation of the source image, wherein the template information is configured to automatically transform the designated areas of the source image without user modification.

7. The method of claim 6 further comprising:

adding image effects to the source image.

8. The method of claim 6 further comprising:

defining a template based upon a series of predefined template selections.

9. The method of claim 6 further comprising:

automatically determining areas of the source image for replacement with template image information.

10. The method of claim 6 further comprising:

manually selecting areas of the source image for replacement with template image information.

11. A method for automatically animating a still image, the method comprising:
   selecting a source image;
   selecting a template;
   selecting regions of the source image; and
   automatically replacing the selected areas of the source image with template image information to produce an animation image sequence, the template image information giving the appearance of animation of the source image.

12. The method of claim 11 further comprising:
   adding image effects to the source image.

13. The method of claim 11 further comprising:
   defining a template based upon a series of predefined template selections.

14. The method of claim 11 further comprising:
   automatically determining areas of the source image for replacement with template image information.

15. The method of claim 11 further comprising:
   manually selecting areas of the source image for replacement with template image information.

16. A system for automatically adding effects to a still image, the system comprising:
   means for selecting a source image;
   means for selecting a template including template information; and
   means for automatically replacing designated areas of the source image with the template image information, the template image information alters the source image to produce special effects
   wherein the template image information is configured to automatically transform the designated areas of the source image without user modification.

17. A system for automatically animating a still image, the system comprising:
   means for selecting a source image;
   means for selecting a template; and
   means for automatically replacing designated areas of the source image with template image information, the template image information giving the appearance of animation of the source image.

18. A system for automatically animating a still image, the system comprising:
   means for selecting a source image;
   means for selecting a template;
   means for selecting regions of the source image; and
   means for automatically replacing the selected areas of the source image with template image information to produce an animation image sequence, the template image information giving the appearance of animation of the source image.

19. A computer readable medium comprising instructions, which when executed on a processor, perform a method for automatically adding effects to still images, comprising:
   selecting a source image;
   selecting a template including template information;
   automatically replacing designated areas of the source image with the template information, the template image information alters the source image to produce special effects,
   wherein automatically replacing occurs without user modification.

20. A computer readable medium comprising instructions, which when executed on a processor, perform a method for automatically animating a still image, comprising:
   selecting a source image;
   selecting a template; and
   automatically replacing designated areas of the source image with template image information, the template image information giving the appearance of animation of the source image.

21. A computer readable medium comprising instructions, which when executed on a processor, perform a method for automatically animating a still image, the system comprising:
   selecting a source image;
   selecting a template;
   selecting regions of the source image; and
   automatically replacing the selected areas of the source image with template image information to produce an animation image sequence, the template image information giving the appearance of animation of the source image.

22. A system for automatically adding effects to a still image, the system comprising:
   a source image;
   a plurality of templates; and
   a modification application to automatically replace designated areas of the source image with template image information from at least one of the plurality of templates, the template information alters the source image to produce special effects wherein the template image information is configured to automatically transform the designated areas of the source image without user modification.

23. The system of claim 22 further comprising:
   template tools to add image effects to the source image.

24. The system of claim 22 wherein the modification application creates a new template based upon a series of predefined template selections from the plurality of templates.

25. The system of claim 22 further comprising:
   a plurality of stock additions to alter the source image for producing a special effect.

26. A system for automatically animating a still image, comprising:
   a source image;
   a plurality of templates; and
   a modification application to automatically replace designated areas of the source image with template image information from at least one of the plurality of templates, the template image information giving the appearance of animation of the source image.

27. The system of claim 26 further comprising:
   template tools to add image effects to the source image.

28. The system of claim 26 wherein the modification application creates a new template based upon a series of predefined template selections from the plurality of templates.

29. The system of claim 26 further comprising:
   a plurality of stock additions to alter the source image for producing a special effect.

30. A system for automatically animating a still image, comprising:
   a source image;
   a plurality of templates; and
   a modification application to automatically replace selected areas of the source image with template image information from at least one template of the plurality of templates for producing an animation image sequence, the template image information giving the appearance of animation of the source image.

31. The system of claim 30 further comprising:

template tools to add image effects to the source image.

32. The system of claim 30 wherein the modification application creates a new template based upon a series of predefined template selections from the plurality of templates.

33. The system of claim 30 further comprising:

a plurality of stock additions to alter the source image for producing a special effect.

* * * * *